United States Patent [19]
Novak et al.

[11] Patent Number: 5,203,587
[45] Date of Patent: Apr. 20, 1993

[54] METHOD OF ASSEMBLY OF A COMBUSTION CUP, FILTER, AND DIFFUSER CUP FOR A VEHICLE OCCUPANT RESTRAINT INFLATOR

[75] Inventors: Conrad M. Novak; John P. O'Loughlin, both of Mesa, Ariz.

[73] Assignee: TRW Inc., Lyndhurst, Ohio

[21] Appl. No.: 629,218

[22] Filed: Dec. 18, 1990

[51] Int. Cl.⁵ .......................................... B60R 21/26
[52] U.S. Cl. ................................. 280/740; 102/531
[58] Field of Search ............. 280/743, 740, 741, 742, 280/728, 730, 731, 736; 102/530, 531; 422/164, 165, 166

[56] References Cited

U.S. PATENT DOCUMENTS

| | | | |
|---|---|---|---|
| 3,985,076 | 10/1976 | Schneiter et al. | 280/741 |
| 4,068,862 | 1/1978 | Ishi et al. | 280/740 |
| 4,131,299 | 12/1978 | Ono et al. | 280/736 |
| 4,530,516 | 7/1985 | Adams et al. | 280/741 |
| 4,578,247 | 3/1986 | Bolieau | 280/741 |
| 4,902,036 | 2/1990 | Zander et al. | 280/740 |
| 4,907,819 | 3/1990 | Cuevas | 280/743 |
| 5,048,862 | 9/1991 | Bender et al. | 280/736 |
| 5,062,367 | 11/1991 | Hayashi | 280/741 |

FOREIGN PATENT DOCUMENTS

| | | | |
|---|---|---|---|
| 0370734 | 5/1990 | European Pat. Off. | 280/736 |
| 0403857 | 12/1990 | European Pat. Off. | 280/736 |
| 01-55859 | 6/1990 | Japan | 280/736 |

*Primary Examiner*—Karin L. Tyson
*Attorney, Agent, or Firm*—Tarolli, Sundheim & Covell

[57] ABSTRACT

An inflator for inflating a vehicle occupant restraint includes an annular slag screen or filter which is disposed between a combustion cup and a diffuser cup. A canister of gas generating material is disposed in the combustion cup. Upon igniting the gas generating material in the canister, gas flows through openings in the side wall of the combustion cup to the slag screen or filter. The gas then flows through a final filter assembly and out of the diffuser cup. The slag filter is preassembled on the combustion cup by radially contracting a surface of the filter to grip the side wall of the combustion cup. This enables the combustion cup and slag filter to be positioned as a unit relative to the diffuser cup and final filter.

10 Claims, 4 Drawing Sheets

METHOD OF ASSEMBLY OF A COMBUSTION CUP, FILTER, AND DIFFUSER CUP FOR A VEHICLE OCCUPANT RESTRAINT INFLATOR

BACKGROUND OF THE INVENTION

The present invention relates to a new and improved apparatus and method for inflating a vehicle occupant restraint. Specifically, the invention relates to an air bag inflator having a filter through which gas passes before entering the air bag.

A known inflator housing which holds materials for generating gas to inflate an air bag is disclosed in U.S. Pat. No. 4,902,036. Upon ignition of the gas generating material in the inflator housing, gas flows through a slag screen or filter. The gas then flows through a final filter assembly. After passing through the final filter assembly, the gas enters the air bag to inflate the air bag.

Although this known inflator is generally satisfactory, the inflator could be improved by increasing the ease with which the inflator is assembled.

SUMMARY OF THE INVENTION

The present invention relates to an improved inflator which inflates a vehicle occupant restraint, such as an air bag. The inflator includes a housing having a combustion cup with a chamber in which gas generating material is located. Gas flows from the combustion cup through a slag screen or filter upon ignition of the gas generating material. The gas then flows through a final filter and is conducted through openings in a diffuser cup to the air bag.

In accordance with a feature of the present invention, the slag screen or filter and the combustion cup are preassembled to facilitate positioning of the slag filter and combustion cup, as a unit, relative to the diffuser cup and final filter assembly. To preassemble the combustion cup and slag filter, a surface of the annular slag filter is radially contracted to grip the combustion cup. Thereafter, the combustion cup and slag filter are positioned as a unit in the diffuser cup with the slag filter between the combustion cup and diffuser cup.

BRIEF DESCRIPTION OF THE DRAWINGS

The foregoing and other features of the invention will become more apparent to one skilled in the art upon a consideration of the following description of the invention with reference to the accompanying drawings in which.

DESCRIPTION OF ONE EMBODIMENT OF THE INVENTION

General Description

Figure 1:
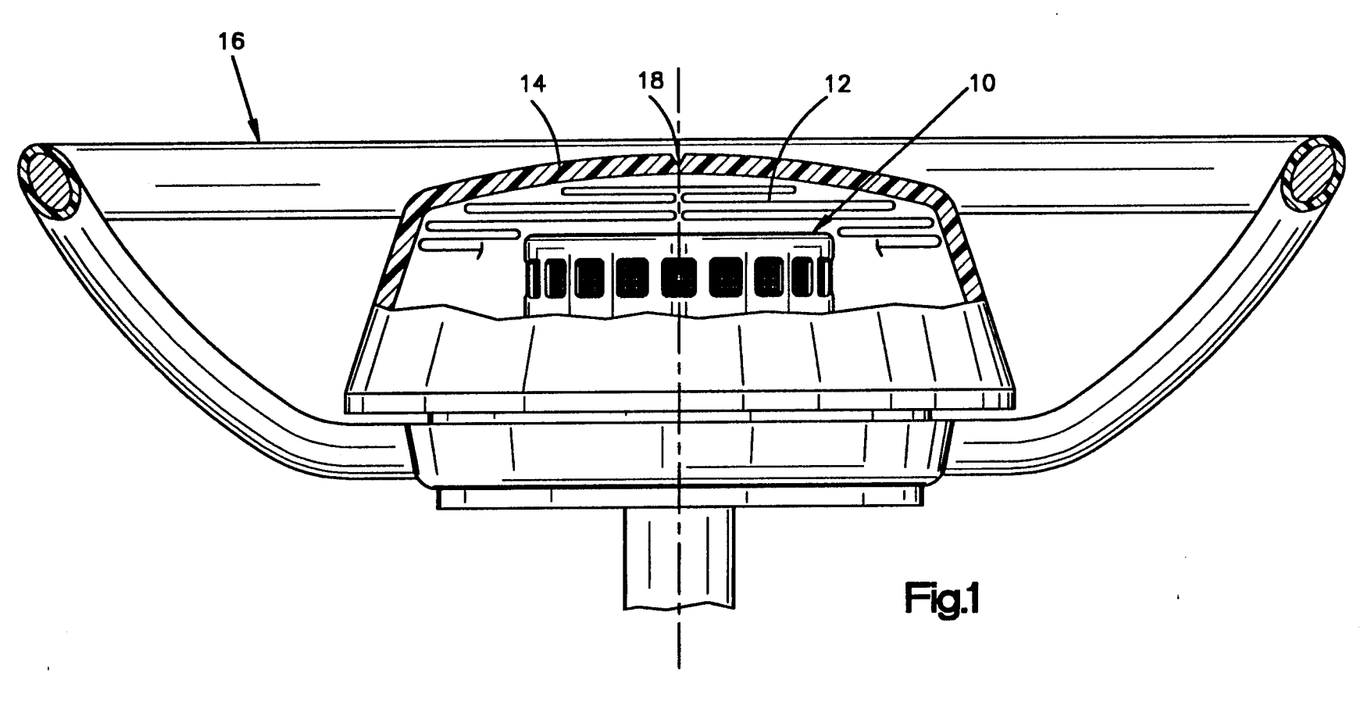
FIG. 1 is a fragmentary sectional view of a safety apparatus constructed in accordance with the present invention and mounted on a steering wheel of a vehicle.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely, a one-piece diffuser cup 42, a one-piece combustion cup 44, and a one-piece combustion chamber cover 46. The diffuser cup 42, the combustion cup 44, and the combustion chamber cover 46 are each made from one piece of sheet metal, such as UNS S30100 stainless steel.

Figure 2:
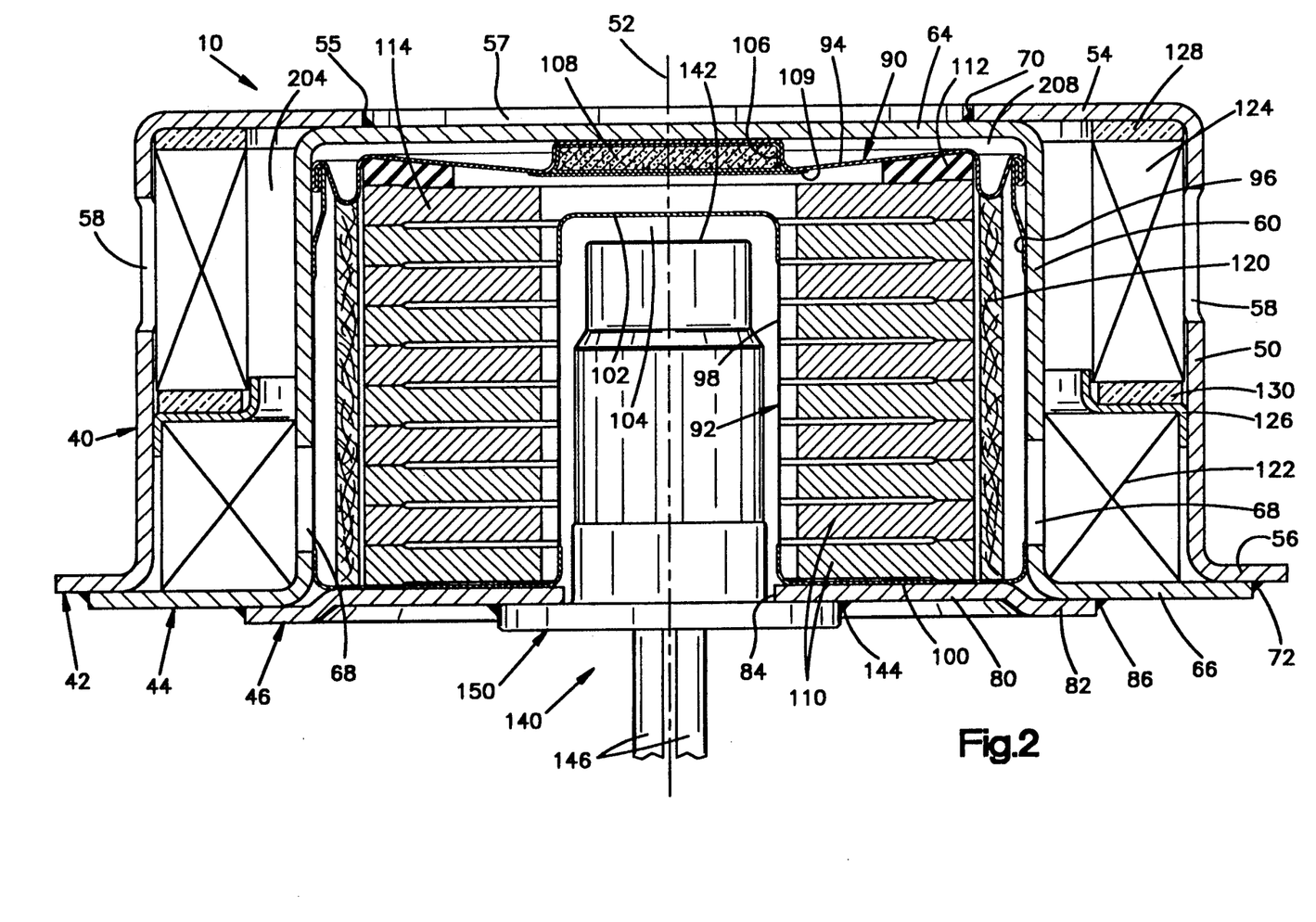
FIG. 2 is an enlarged sectional view illustrating the construction of an inflator used in the safety apparatus of FIG. 1.

The diffuser cup 42 is generally cup-shaped, is a single piece of sheet metal, and has a cylindrical side wall 50 extending around the central axis 52 of the inflator 10. The side wall 50 extends between a flat upper annular end wall 54 and a flat lower annular flange 56. The annular flange 56 extends radially outwardly from an end of the diffuser cup opposite from the end wall 54 and is coaxial with the side wall 50. A circular inner annular surface 55 on the upper end wall 54 of the diffuser cup 42 defines a central circular opening 57 in the upper end wall 54 which minimizes the weight of the diffuser cup. The end wall 54 and the flange 56 are parallel to each other and perpendicular to the axis 52. An annular array of gas outlet openings 58 extends circumferentially around an upper portion of the diffuser cup side wall 50.

The combustion cup 44 (FIGS. 2 and 3) is generally cup-shaped, is a single piece of sheet metal, and is disposed inside the diffuser cup 42. The combustion cup 44 has a cylindrical side wall 60 extending around the axis 52. The cylindrical side wall 60 extends between a flat imperforate circular upper end wall 64 and a flat lower annular flange 66. The flange 66 is disposed in a coaxial relationship with the cylindrical side wall 60 and extends radially outwardly from an end of the side wall 60 opposite from the end wall 64. The upper end wall 64 and the lower flange 66 are parallel to each other and perpendicular to the axis 52. An annular array of openings 68 extends circumferentially around a lower portion of the combustion cup side wall 60.

The upper end wall 64 of the combustion cup 44 is welded, with a circular continuous weld, to the annular surface 55 on the upper end wall 54 of the diffuser cup 42 at a weld location 70, preferably by laser welding.

The combustion cup flange 66 is welded with a circular continuous weld to the diffuser cup flange 56 at a weld location 72, also preferably by laser welding.

The cover 46 is also formed from a single piece of sheet metal. The combustion chamber cover 46 is a generally flat circular metal piece having a circular center portion 80 and a parallel but slightly offset annular outer flange 82. A circular opening 84 is located in the center portion 80 of the chamber cover 46. The opening 84 is coaxial with the diffuser and combustion cup side walls 50 and 60. The outer flange 82 of the chamber cover 46 overlaps the combustion cup flange 66 and is welded with a circular continuous weld to the combustion cup flange 66 at a circumferential weld location 86, again preferably by laser welding. The circular weld locations 70, 72 and 86 are coaxial with the central axis 52 of the inflator. The welds may be formed by a Rofin-Sinar 850 $CO_2$ Laser.

A hermetically sealed canister 90 (FIG. 2) is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 (FIG. 2) has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which, when ignited, generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen or filter indicated schematically at 122 is located in the diffuser cup 42, outside of the combustion cup 44. The slag filter 122 is disposed radially outward of the openings 68 and lies against the combustion cup side wall 60. However, the slag filter 122 could be spaced away from the openings 68 in the combustion cup side wall 60.

An annular final filter assembly indicated schematically at 124 is located inside the diffuser cup 42 above the slag screen or filter 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). Within the igniter 142, the wire leads 146 are connected to a resistance wire embedded in an ignition material. The igniter 142 may be of any suitable well known construction. A thin plastic film (not shown) is located on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the gas, and molten combustion products plate on the prefilter. The gas flows through the openings 68 and into the slag screen or filter 122.

The slag screen or filter 122 removes and traps particles from the flowing gas. The slag filter 122 also cools the flowing gas. When the gas cools, molten combustion products such as metal are plated onto the slag filter 122. The filter shield 126 between the slag filter 122 and the final filter assembly 124 causes turbulent flow of gas to occur in and around the slag filter. The turbulent gas flow promotes the retention of relatively heavy particles in the slag filter 122 and in the lower portion of the diffuser cup 42.

The gas flows axially upwardly from the slag filter 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

In accordance with one of the features of the present invention, the slag filter 122 is preassembled on the combustion cup 44. The preassembled combustion cup 44 and slag filter 122 are then positioned as a unit in the diffuser cup 42. By preassembling the combustion cup 44 and slag filter 122, assembly of the inflator 10 is facilitated.

Figure 3:
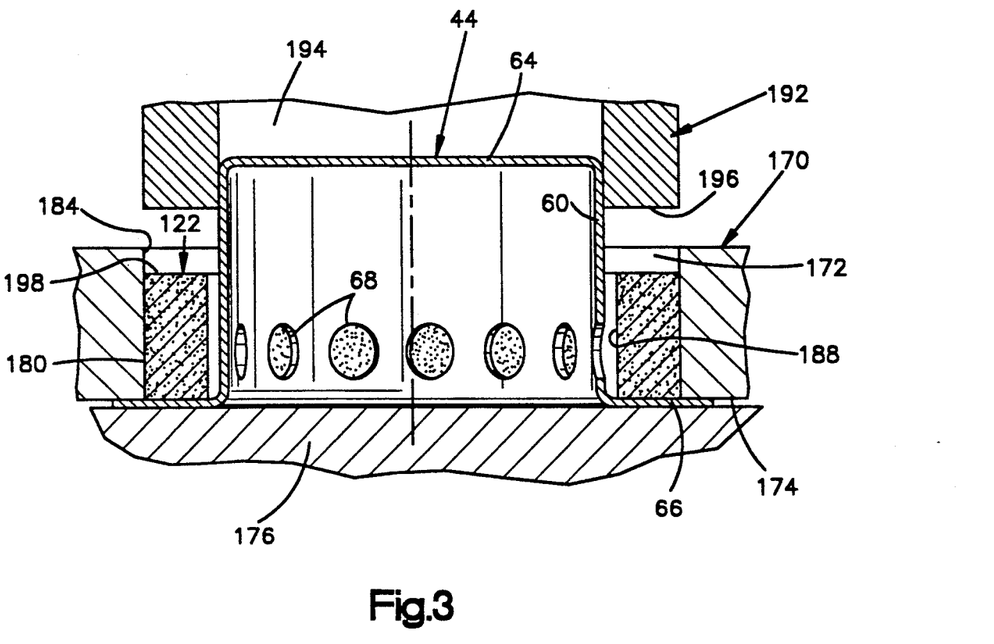
FIG. 3 is a schematic illustration depicting the manner in which a slag screen or filter is positioned around a combustion cup in a die.

To preassemble the slag filter 122 on the combustion cup 44, the combustion cup is positioned in a cylindrical die cavity 172 defined in part by a circular die ring 170 (FIG. 3). The cylindrical side wall 60 of the combustion cup 44 is positioned in the cylindrical die cavity 172 with a central axis of the combustion cup coincident with a central axis of the die cavity and the die ring 170. The annular combustion cup flange 66 is disposed in abutting engagement with an annular radially extending lower surface 174 of the die ring 170. The combustion cup 44 is supported and held in place by a backing plate or member 176, which underlies both the combustion cup and the die ring 170.

The annular slag filter 122 is positioned in the die cavity 172 around the cylindrical outer side wall 60 of the combustion cup 44. A cylindrical radially outer side surface 180 of the slag filter 122 loosely engages a cylindrical radially inner side surface 184 of the die ring 170. A cylindrical radially inner side surface 188 of the slag filter 122 is coaxial with and spaced radially from side wall 60 of the combustion cup 44. Since the inside diameter of the annular slag filter 122 is greater than the outside diameter of the combustion cup side wall 60, the slag filter can be readily positioned around the side wall with the radially extending lower end of the filter supported by the combustion cup flange 66 (FIG. 3).

Once the slag filter 122 has been positioned in the die cavity 172, a hollow cylindrical upper die 192 is lowered. As the die 192 is lowered from a raised position above the combustion cup 44 to the position shown in FIG. 3, the upper end portion of the combustion cup 44 enters a cylindrical cavity 194 in the upper die 192. Continued downward movement of the upper die 192 moves the upper die into the cylindrical cavity 172 in the die ring 170. The upper die 192 is then in a relatively close fitting relationship with both the radially outer surface of the combustion cup side wall 60 and the radially inner surface 184 of the die ring 170. Continuing its downward movement, the upper die 192 moves its annular radially extending lower surface 196 into abutting engagement with an annular radially extending upper surface 198 of the slag filter 122.

Further downward movement of the upper die 192 compresses the slag filter 122 vertically between the combustion cup flange 66 and the upper die. As the slag filter 122 is compressed vertically, the material of the filter is forced radially inwardly to fill the space between the filter and the combustion cup side wall 60. In effect, the radially inner side surface 188 of the slag filter contracts radially inwardly (FIG. 4) and firmly grips the side wall 60 of the combustion cup 44. Although the pressure applied by the upper die 192 against the slag filter 122 is sufficient to cause the inner side surface 188 of the slag filter to contract radially inwardly to grip the combustion cup side wall 60 securely, the pressure is not so great as to compact the material of the slag filter excessively and to increase its resistance to fluid flow undesirably.

The slag filter 122 is preferably a knitted stainless steel structure having long cylindrical wires with smooth longitudinal surfaces and no sharp end points. The material of this specific slag filter 122 is UNS S30400 stainless steel per the ASTM-A-580 standard and can be obtained from Metex Corporation of New Jersey. The Density Range of the material is from 10 to 30 percent by volume. This specific stainless steel filter has a 15 percent density by volume. The slag filter 122 could, however, be formed of other materials and/or have a different density, if desired.

Figure 4:
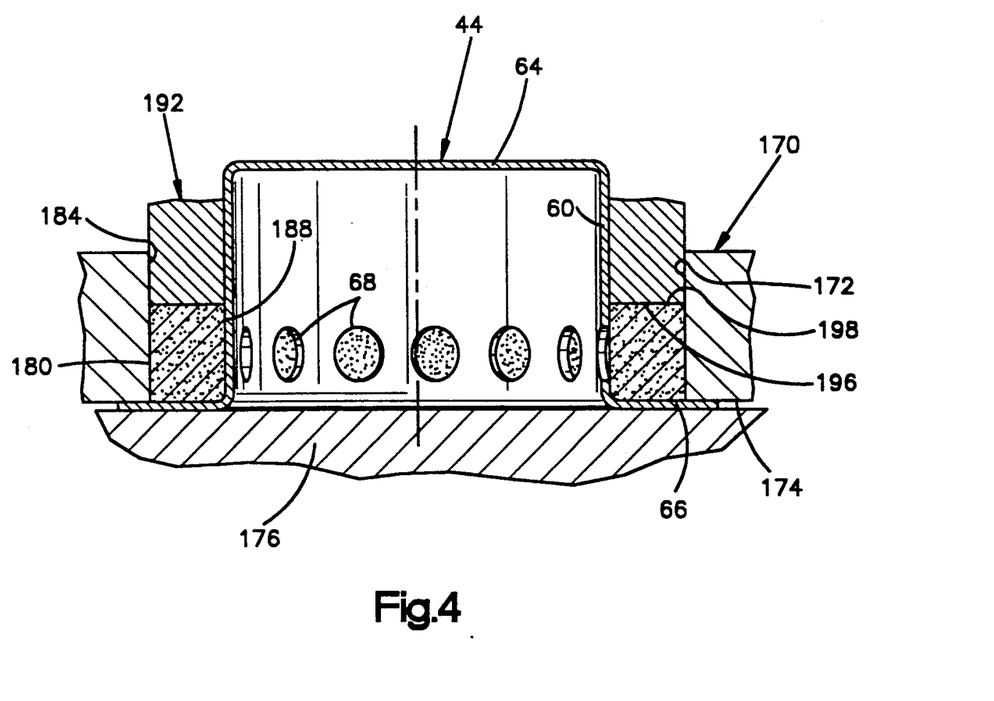
FIG. 4 is a schematic illustration, generally similar to FIG. 3, depicting the manner in which the slag screen or filter is radially contracted to grip a side wall of the combustion cup.

Once the inner side surface 188 of the slag filter 122 has been radially contracted to grip the combustion cup side wall 60, the die 192 is raised and the support plate 176 is lowered to enable the preassembled combustion cup 44 and slag filter 122 to be removed as a unit from the die cavity 172. At this time, the frictional grip of the slag filter 122 on the combustion cup 44 is sufficient to hold the slag filter in abutting engagement with the combustion cup flange 66. When preassembled with the combustion cup, the slag filter 122 overlies the combustion cup side wall openings 68.

Figure 5:
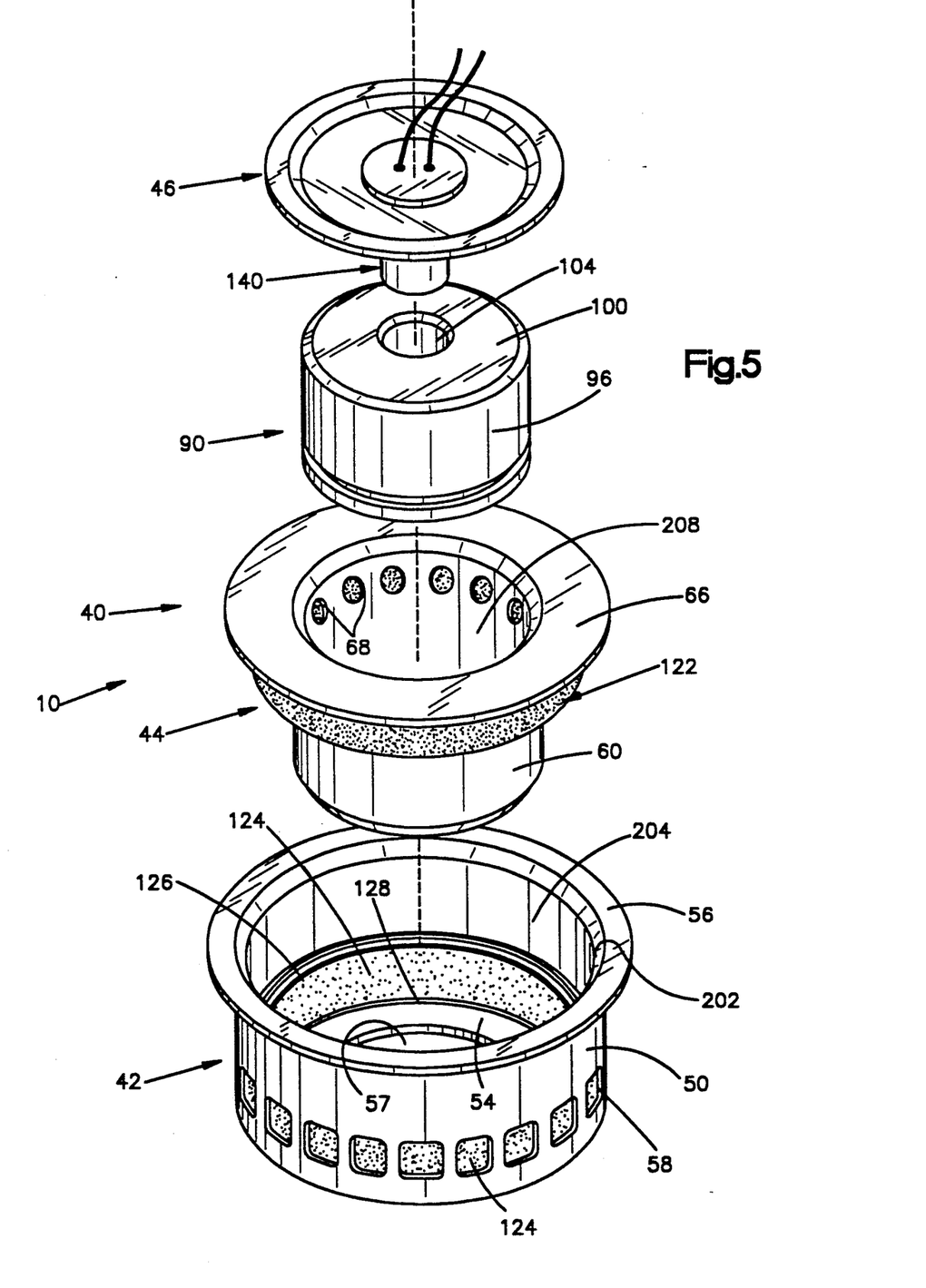
FIG. 5 is an exploded perspective view of the components of the inflator in an upside down orientation for assembly.

Once the combustion cup 44 and slag filter 122 have been preassembled, the combustion cup and filter are ready to be assembled as a unit with other components of the inflator 10. However, before the combustion cup 44 and slag filter 122 are assembled with the other components of the inflator 10, the annular final filter assembly 124 (FIG. 5) is positioned in a cylindrical chamber 204 in the diffuser cup 42. The diffuser cup 42 is oriented upside down, as shown in FIG. 5, and the graphite seal 128 is placed against the diffuser cup end wall 54. The final filter assembly 124 is then positioned in abutting engagement with the graphite seal 128. Although it is preferred to assemble the components of the inflator 10 in the upside down orientation illustrated in FIG. 5, they could be assembled in a different orientation if desired.

Once the final filter assembly 124 has been positioned in the diffuser cup 42, the graphite seal 130 (FIG. 2) is placed on top of the filter assembly. The annular filter shield 126 is then positioned in the diffuser cup. An interference fit is provided between the outer side surface of the filter shield 126 and the cylindrical radially inner side surface of the diffuser cup side wall 50. This interference fit holds the filter shield 126 in place against the graphite seal 130 and adjacent an end of the final filter assembly 124 which is opposite the diffuser cup side wall 54.

Once the filter shield 126 has been inserted into the diffuser cup 42, the combustion cup 44 and slag filter 122 are positioned in the diffuser cup 42 as a unit. Specifically, the leading or lower (as viewed in FIG. 5) end portion of the combustion cup 44 is telescopically inserted into the diffuser cup 42. The annular final filter assembly 124 and filter shield 126 will thus encircle the combustion cup 44. The combustion cup end wall 64 (FIG. 2) also moves into flat abutting engagement with an annular radially extending inner surface of the diffuser cup end wall 54.

As the end wall 64 of the combustion cup 44 engages the diffuser cup end wall 54, the annular radially extending flange 66 on the combustion cup 44 moves into flat abutting engagement with the annular radially extending diffuser cup flange 56. In addition, the slag filter 122 moves into abutting engagement with the filter shield 126. Although it is preferred to position the combustion cup 44 and slag filter 122 relative to the diffuser cup 42 and final filter assembly 124 by moving the cup could be moved relative to the combustion cup, if desired.

When the slag filter 122 has been positioned in abutting engagement with the filter shield 126 (FIG. 2), there is an annular space between a radially inner side surface of the final filter assembly 124 and a radially outer side surface of the cylindrical combustion cup side wall 60. This space forms a passage through which gas flows from the slag filter 122 upwardly (as viewed in FIG. 2) along the combustion cup side wall 60 to the final filter assembly 124. The gas then flows radially outwardly through the annular final filter assembly 124 and openings 58 to the air bag which is to be inflated by the gas.

Once the combustion cup 44 and slag filter 122 have been positioned as a unit in the diffuser cup 42, the diffuser cup and combustion cup end walls 54 and 64 (FIG. 2) are interconnected by the continuous circular weld at weld location 70. Also, the combustion cup flange 66 is welded to the diffuser cup flange 56. Thus, a continuous circular weld 72 connects the periphery of the combustion cup flange 66 with a downwardly facing (as viewed in FIG. 2) surface of the diffuser cup flange 56.

The canister 90 is then inserted into the cylindrical chamber 208 (FIG. 2) defined by the combustion cup 44. As the canister 90 is inserted into the combustion cup chamber 208, the end wall 94 of the canister engages the combustion cup end wall 64. The initiator assembly 140 is connected with the cover 46 by the continuous circular weld 144 while the cover is spaced from the combustion cup 44 and diffuser cup 42. Once the initiator assembly 140 has been connected with the cover 46, the initiator assembly 140 is telescopically inserted into the cylindrical recess 104 at the center of the canister 90. The canister 90 is pressed by the cover 46 against the combustion cup end wall 64. The canister end wall 94 is deflected axially inwardly and compresses the cushion 112 against the upper disk 114 of gas generating material. At the same time, the cover flange 82 moves into flat abutting engagement with the combustion cup flange 66.

The cover flange 82 is then welded to the combustion cup flange 66 with the continuous circular weld 86. It should be noted that the continuous circular weld 86 is the only weld which is made to the inflator housing 40 after the canister 90 of gas generating material has been positioned in the combustion cup 44.

From the above description of the invention, those skilled in the art will perceive improvements, changes and modifications in the invention. Such improvements, changes and modifications within the skill of the art are intended to be covered by the appended claims.

Having described the invention, the following is claimed:

1. A method of assembling an inflator for use in inflating a vehicle occupant restraint, said method comprising the steps of:

positioning an annular filter relatively loosely around the outside of a combustion cup;

gripping the combustion cup with the filter by axially compressing the filter to radially contract a surface of the filter so that the filter grips relatively tightly around the outside of the combustion cup after performing said step of positioning the annular filter relatively loosely around the outside of the combustion cup; and, thereafter, positioning the combustion cup and said filter as a unit in a diffuser cup with the filter between the combustion cup and the diffuser cup.

2. A method as set forth in claim 1 wherein said step of gripping the combustion cup by radially contracting said surface of the filter includes applying an axially directed force against the filter to decrease the axial extent of the filter.

3. A method as set forth in claim 1 wherein said step of gripping the combustion cup with the filter by radially contracting a surface of the filter includes pressing one end of the filter against a flange which extends radially outwardly from a cylindrical side all of the combustion cup and radially contracting said surface of the filter to grip a portion of the combustion cup side wall adjacent to the flange.

4. A method as set forth in claim 1 further comprising the steps of interconnecting the combustion cup and the diffuser cup, positioning a canister containing gas generating material in a chamber in the combustion cup, closing the chamber in the combustion cup with a closure member, and interconnecting the combustion cup and the closure member.

5. A method of assembling an inflator for use in inflating an occupant restraint, said method comprising the steps of:

positioning a first filter in a chamber in a diffuser cup for directing gas to the occupant restraint;

securing a second filter around the outside of a combustion member with the combustion member and second filter spaced from the diffuser cup and first filter, the second filter and the combustion member thereby forming a unit; and, thereafter, positioning the unit of the second filter and the combustion member in the chamber;

wherein said step of positioning the second filter around the outside of the combustion member includes gripping the combustion member with the second filter by radially contracting a surface of the second filter.

6. A method as set forth in claim 5 wherein said step of positioning the unit of the second filter and the combustion member in the chamber includes positioning the combustion member with a portion of the combustion member extending into the first filter.

7. A method as set forth in claim 5 wherein said step of positioning the unit of the second filter and combustion member in the chamber includes engaging an end wall of the diffuser cup with the combustion member.

8. A method as set forth in claim 5 wherein said step of positioning a second filter around the outside of a combustion member includes engaging an annular flange extending from a combustion member side wall with the second filter, and wherein said step of positioning the unit of the second filter and the combustion diffuser in the chamber includes engaging the diffuser cup with said flange.

9. A method as set forth in claim 5 including the step of positioning gas generating material within the combustion member.

10. A method of assembling an inflator for use in inflating a vehicle occupant restraint, said method comprising the steps of:

positioning a annular filter around the outside of a combustion cup;

gripping the combustion cup with the filter by radially contracting a surface of the filter after performing said step of positioning the annular filter around the outside of the combustion cup; and, thereafter, positioning the combustion cup and the filter as a unit in a diffuser cup with the filter between the combustion cup and the diffuser cup; and further comprising the step of positioning a second filter in the diffuser cup, said step of positioning the combustion cup and filter in the diffuser cup including positioning the combustion cup in the second filter.

* * * * *

UNITED STATES PATENT AND TRADEMARK OFFICE
CERTIFICATE OF CORRECTION

PATENT NO. : 5,203,587

DATED : April 20, 1993

INVENTOR(S) : Conrad M. Novak; John P. O'Loughlin

It is certified that error appears in the above-identified patent and that said Letters Patent is hereby corrected as shown below:

Column 8, line 32, delete "all" and insert -- wall --.

Signed and Sealed this

Eleventh Day of January, 1994

Attest:

BRUCE LEHMAN

Attesting Officer     Commissioner of Patents and Trademarks